Patented Apr. 7, 1942

2,279,280

UNITED STATES PATENT OFFICE 2,279,280

METHOD FOR PREPARING DEHYDRATED PEAS AND BEANS

Albert Musher, New York, N. Y., assignor to Musher Corporation, New York, N. Y., a corporation of New Jersey No Drawing. Application May 10, 1939, Serial No. 272,758

3 Claims. (Cl. 99—98)

The present invention relates to foods, and it particularly relates to dehydrated foods as well as to the methods of preparing such foods.

Food products, and particularly those of a relatively high moisture content, such as vegetables, fruits, meats, fish, and other food products cannot be readily stored over periods of time without the possibility of spoilage due to fermentation, mold growth, putrefaction and similar deterioration.

Various methods have therefore been devised in order to protect these foods as much as possible against such deterioration effects, as for instance, refrigeration, dehydration, etc.

Of these two methods, refrigeration and dehydration, it is generally agreed that refrigeration is the most expensive procedure, and therefore the dehydration of foods is much more preferable from the standpoint of economy, convenience, etc. However, dehydrated foods have other disadvantages, most particular of which is the disadvantage that such dehydrated foods are very difficult to prepare and cook because of the fact that in the dehydrating procedure as well as in the storage period that follows, there is a tendency for these dehydrated foods to become quite tough, and hard, and compacted and therefore they are quite resistant to the influence of boiling or hot water when they are ready for the cooking procedure.

Because of the formation of the hard surfaces on these dehydrated foods, and because of the formation of hardness throughout the dehydrated food, long cooking procedures as well as soaking procedures are necessary in order to place the food in condition for consumption.

Naturally, aside from the inconvenience and difficulty in preparing foods from dehydrated products, there is also frequently lost, because of these long cooking procedures that are necessary, many of their flavors, essences, vitamins and other valuable qualities and characteristics.

It is therefore among the objects of this invention to provide improved dehydrated or dried foods, and methods and processes for preparing them, so that they may be readily shipped, stored and merchandised with the convenience and economy of dehydrated foods, but also with the new advantage that when they are used by the consumer, they may be used with substantially less difficulty than heretofore possible with the usual dried or dehydrated food products.

The consumer will thereby be enabled to prepare dehydrated foods much more quickly than heretofore possible into various completed food materials as for instance, soups, sauces, gravies, desserts, various vegetable or meat dishes, breakfast foods, etc.

An object of this invention therefore is to eliminate the necessity for expensive refrigeration methods to preserve various food products, and particularly those of a relatively high moisture content, and, at the same time to provide improved dried foodstuffs that do not require the prolonged boiling or soaking procedures of normally dried or dehydrated foods.

A further object of this invention is to produce food products which have more digestible qualities than ordinary dehydrated foods in that the food structure and cell structure is not compacted together and thereby is not toughened to the same extent as ordinary dehydrated foods.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

It has been found that the above objects may be accomplished by subjecting the foodstuff to a cooking, steaming or similar operation which will have the effect of rupturing the cells, or fibers, etc., or softening the fiber or cell structure of these materials, followed by dehydrating these materials to a sufficiently low moisture content to preserve them, and then, if desired, expanding or exploding these food materials. This process, will produce relatively quicker cookable food products, in dehydrated condition.

Among the food materials that may be treated in accord with this invention are, for instance, carrots, celery, meat, fish, vegetables, fruits and other materials such as cereals, grains, beans, peas, seeds, etc.

It is preferable, in the carrying out of this invention, to control the process, and particularly the cooking or steaming procedure, so as to retain as much as possible of the water soluble flavors and other flavors, essences and qualities of the food products. This is usually done by such methods as cooking or steaming under vacuum, or under pressure, etc. However, in carrying out this invention, cooking can take place by any of the usual cooking or steaming procedures, either under pressure, or under vacuum, or at room temperature, or in the presence of inert gases, such as carbon dioxide, nitrogen and so forth.

It is in many cases preferable in this cooking operation to have the food cooked or steamed in its own juice, or at least in a high concentration of its own juice. However, water or other aqueous materials, etc., may be used for this cooking procedure, as desired.

It is generally desirable, however, that, at the end of the cooking operation, no free water, or at least a very small amount of the free water remains because it is obviously desired that as much of the flavor of the food product as possible be retained or re-absorbed back into the food, rather than have it in the exterior aqueous material. However, if any excess aqueous material remains it may be dehydrated if desired and the dehydrated material placed along with the food product in order to enhance the food flavor.

The cooking or steaming procedure should be for such a period of time and at such a temperature so as to produce a food product which is in a relatively soft condition, or with the cell structure substantially disrupted.

In many cases it has been found preferable in order to retain as much flavor as possible to use a waterless cooker in which the foods cook or steam in their own moisture, either at atmospheric pressure, or at increased pressure, or under vacuum.

Although the ordinary cooking or steaming procedures as disclosed herein are usually preferable, nevertheless other cooking procedures may be used, as for instance, induction heating, which may take place under conditions of various pressures and temperatures, or in conjunction with other cooking or steaming processes.

In the various cooking treatments herein described, the water should be present, preferably in sufficient amount so as to be substantially throughout the entire food, and preferably should be as uniformly distributed as possible so that in the cooking or steaming operations that take place, the entire structure of the food will be affected.

It is generally preferred to have the water in the food pieces present not only in its relatively free form in the fibers, and in the structure of the food, but also within the cells, or in bound water form. In connection with the steaming and cooking procedures that are involved, this position of the water is utilized to advantage in view of the fact that the bound water which is contained within the cell structure aids in breaking the cell walls so as to improve the absorptive quality of the end product, whereas the relatively free water between the cells and fibers aids in disrupting and separating the fibers and body structure so as to further enable quick cooking characteristics.

In many cases, generally, it is desirable to cut the food into smaller pieces and process them in this condition in accord with this invention. Particularly is this desirable where it is desired to have a quicker or more complete and more thorough penetration of the cooking, steaming, exploding, or other procedures. Of course, the cutting of peas, beans, and similar small-sized foods is usually not required or desirable.

Where, instead of using full water content food materials, such as foods in their fresh condition, it is desired to start with dehydrated or dried materials, there should be a sufficient amount of water or other aqueous materials added, in order to re-hydrate the food materials to the desired water content. This procedure also applies to normally low water content or normally dry materials such as cereals, seeds, and other materials of similar nature.

After the cooking has proceeded to such a degree that the structure of the food, or the fibers and cell structure are thoroughly softened, preferably, without destroying the unity of the food piece, the product is then subjected to a procedure that will markedly retard the development of any decay or decomposition of the food.

It has been found, for example, that if the food product is now dehydrated, after this cooking or steaming operation, to a relatively low moisture content preferably below 20 to 25%, and desirably above 2% to 5%, that the food product acquires high stability and does not tend to spoil or deteriorate, and will have relatively all of the stabilized qualities of dried food products except that now, these food products may be much more readily cooked and prepared without the usual long soaking and long boiling procedures that were hitherto necessary.

Although in this dehydration operation it may be desirable for various purposes to reduce the moisture content to various points, it has usually been found that it is preferred to have at least 2% to 3% of moisture in the final product, or to have above 5% to 7% moisture in the final product so as to enable more ready cookability which is not readily available when the product is entirely dried out. This also has the advantage of retaining at least some of the water soluble flavors, so as to enhance the flavor element.

It is also advisable to seal the product hermetically, or under a vacuum or with various water repellent coatings, etc., so as to retain as much as possible of this moisture within the food material, and also so as to keep the food fibers as soft as possible in order to enable quicker cooking characteristics.

Where these products are packed in cans, or jars, or in other containers which may be subjected to sterilization, mold prevention processes, etc., these products may be sterilized or similarly treated in these containers in the usual canning, preserving, or sterilizing methods.

In the drying procedure it is often desirable to carry out the drying in such a way that the food materials will oxidize as little as possible. For this reason the drying may be carried out under vacuum, or in an atmosphere of carbon dioxide or nitrogen, or in other inert atmospheres.

Desirably the drying temperatures may vary for example from 80° F. to 212° F., or more or less, depending upon whether vacuum is used, the degree of dryness that is required or the general characteristics of the food material that is being dried, or depending upon other results or characteristics desired. However, for most purposes the preferred temperatures of dehydration run for example between 120° and 190° F., and the length of time for dehydration necessarily depends upon the amount of dehydration required, the temperature, and other conditions.

One of the usual results of the products produced in accord with this invention is that a relatively greater water-absorbent quality is produced in the food. This enables substantially quicker absorption of water than is possible with normally dried or dehydrated food products, and therefore, improved cookability results. The usual long soaking and long boiling procedures that were heretofore necessary with normally dried or dehydrated products is now substantially reduced.

Instead of drying the food materials in a dry heat, at this point or at other points throughout the procedures as described herein, these food materials may be placed into a liquid oil or into a molten hard fat and dried to the required moisture content. The molten hard fat in which the food materials are boiled or dried may be allowed to congeal, particularly by quick chilling, so as to immediately harden around the food pieces and thereby so as to act as a water repellent in order to keep as much moisture as possible within the food pieces, and also so as to more fully retain the softness of the fiber structure.

This drying with fats or oils usually takes place at temperatures above the boiling point of the water, and preferably at not too high temperatures, so as to avoid loss of flavor, etc. The molten hard fat can then congeal around the food pieces immediately after the required moisture has been evaporated, and thereby will provide a condition whereby a fat protection will take place immediately after the required amount of moisture has been evaporated, so that there will be relatively little or no oxidation or other deterioration effects taking place from the time the product has been dried until it is protected with the fat.

Various repeated cookings may be used to enhance the procedure herein described, or combinations of various cookings, at various temperatures, and under various conditions of vacuum, pressure, etc., in varied sequence, may be used if desired in order to produce the desired amount of softening, or fiber or cell disruption.

Sudden changes in temperature from higher, to lower, to higher temperatures, etc., with repetition, as required, are quite effective as thermal shocks to produce or enhance cell and structure disruption.

Where desired, starch-containing materials may be washed, before or after cooking, one or more times, or at suitable points, so as to wash out all, of whatever amount of starch it is wished to eliminate. In many cases, the washing out of the starch, particularly where it is present in high amount, is quite desirable, so that in the drying or dehydrating operation there is less tendency for the starch that is present to harden or cake. Also, if substantially all of the starch has been washed out and the product is then expanded or exploded, as described hereinafter, the resultant product will not have the usual characteristics of an exploded starch product.

The food products resulting from this process of cooking and drying, or various combinations of these processes as described herein, may be directly sold and merchandised as edible food products to be used either alone or in conjunction with the manufacture of prepared food materials as for instance soups, sauces, gravies and in the making of many other foods. These food products prepared in accord with this invention may be much more readily cooked and will have other similar valuable characteristics and improvements as compared with the ordinarily dehydrated food materials.

Where it is desired to enhance the character of these foodstuffs and render them even more susceptible to quick-cookability, and where it is desirable to shorten the cooking time of some food materials which may have been previously cooked and dehydrated, these food materials may be expanded or exploded, and their structure thereby opened up or given an extra disruption by means of subjecting them to an elevated temperature and pressure which is then suddenly and instantaneously released.

For example, after the cooking and dehydration, or other treatments described herein, the food pieces whether they be meats, vegetables, fruits, fish, peas, beans, apples, celery, etc., may be placed into a closed chamber or into a pressure gun and subjected to elevated temperatures as for example, above 200° to 250° F. but desirably, for most purposes, the temperatures should range between 300° and 500° F.

While in this chamber, steam, or other fluid pressure vapor, etc., may be admitted, or sufficient steam may be created from the water present in the dehydrated material. As a general rule the material should preferably contain less than 35% of moisture and generally between about 7% to about 20% when placed into this closed chamber. Also, for purposes of quick cookability, the resulting exploded or expanded product should contain some moisture, and usually, above 2% to 5%.

The pressure also may be considerably varied, as, for example, from about 30 or 40 pounds per square inch to 200 to 300 pounds per square inch, although the pressure, temperature, length of time involved, and other conditions may be adjusted to whatever amounts and conditions are necessary to produce the desired results, and depending upon the characteristics of the products treated.

The length of treatment in this closed chamber may be above a few seconds and may be as long as 18 to 20 minutes, or longer, although usually the length of exposure in the pressure gun, prior to being ejected by the explosion, runs for example from 5 to 45 seconds up to 5 to 8 minutes.

Then, after this treatment has been completed, the chamber is opened and the food materials permitted suddenly and instantaneously to be ejected so as to expand, and so as to form passageways, particularly connecting passages, interstices, etc., and usually, of greater than capillary size, so that if the product is placed in water it will be most readily cooked, since the water can readily penetrate therein and contact as much fiber and cell structure as possible so as to produce quickly-water-permeable, and quick-cookable characteristics.

Although this procedure of explosion disruption or expansion is carried out in one step, it may be also carried out in a plurality of steps in which case the same, or different temperatures and pressures and time periods may be utilized. For example, the food material may be subjected to 1 or 2 or 3 explosion or expansion treatments of the character above described at temperatures varying from 200° to 300° F. and at pressures varying from 20 to 30 or 40 pounds per square inch, and for time periods varying from 15 seconds up to several minutes.

This multiple expansion or explosion procedure is particularly desirable where the food structure is rather delicate and where excessively high temperatures are liable to cause caramelization of the sugar, or destruction of other materials present in the food product which give it its desirable flavor or quality as the case may be. In these cases, for instance, a multiple expansion procedure at a lower temperature and/or pressure has advantages over a single explosion at a higher temperature and/or pressure, and usually the time, temperature, and pressure of multiple explosion processes is so regulated that each explosion of the multiple process is not sufficient to provide the full cooking quality that is desired, but relatively less intense explosions take place, which, in the aggregate, will result in the cookability required, without the disadvantages of loss of flavor, caramelization of sugar, excessive disruption of structure, etc.

The food products treated with this explosion procedure may be ejected from the pressure chamber, if desired, into oil or molten fat, into fatty or other vapors, or into atmospheres of nitrogen, carbon dioxide, or other inert gases, etc. These embodiments may be used to aid in retention of flavors, retarding or elimination of discoloration, oxidation, etc.

Also where desired, the foods, such as peas, beans, etc., may be powdered or pulverized, after the dehydration, or after the dehydration and explosion, and then, if desired they may be dipped into or coated with a plastic or molten fat, etc., to retard discoloration, etc.

Although the usually preferred procedure, generally, for most products, is the procedure of first cooking or steaming, the food material, and then dehydrating, and then expanding or exploding, where desired, nevertheless, depending upon the conditions available, the results that it is desired to accomplish, the characteristics of the food and other considerations, various of these operations may be repeated as required in order to enhance this procedure. Also, this sequence may be varied from time to time as required.

For instance, the food product may be first dehydrated sufficiently to explode, and then it may be expanded or exploded, and then the product may be cooked or steamed, and then it may be dehydrated again to put it into its finished condition, and if desired, the resultant product may be expanded or exploded again.

It is generally found with many food products that the cooking procedure herein described, when combined with the explosion process, usually produces much more acceptable products in their quickly-cookable condition than when the same foods are treated by an explosion process alone. This is because, with many food products, there is a tendency for the explosion to tear, or shred, or disrupt the structure much more than is desired, with the result that mushiness, and also various burnt, and other off-flavors are produced. In fact, in many cases, when a less intense explosion is given in conjunction with the cooking procedure as described herein, it is not sufficient to produce the full cookability desired, when used alone, without the cooking procedure, whereas when this same explosion is used in conjunction with food prepared in accord with this invention, the resultant foods are of a precooked or pretreated nature so as to enable their having relatively more soft and tender qualities, and this less intense explosion that is given thereby results in opening the structure so as to permit the quick entrance of the cooking water into the structure thereof.

Furthermore, in a process of violent explosion, there is not utilized the slow cooking, or fiber softening procedures such as is found with the cooking and steaming procedures, etc., as described herein. These slow cooking or pre-softening procedures are quite important with many foods in order to produce properly cooked qualities.

As one embodiment of this invention, carrots are carefully washed and scalded for about 4 or 5 minutes in order to loosen the skins. They are then cut into pieces of the required size and cooked at a steam pressures of 15 pounds per square inch for about 1 hour. Depending upon the type of carrot that is used, and the size of the pieces into which it is cut, etc., the cooking procedure may be varied for longer or shorter periods, so as to result in very soft carrot pieces.

In handling the carrots after they have been cooked, care should be taken not to mash or break their whole condition.

The cut carrots are then placed on drying trays and are dried at an initial temperature of about 140° F., which is gradually increased to about 160° or 165° F. The time required for this drying operation depends upon the size of the carrot pieces, the type of dehydrator used, whether or not a fan is used in order to keep the air circulating, and upon various other conditions.

However, the carrots should not be dried until they are brittle, because if they are entirely dried out, their quick cookability will be affected.

With the moisture adjusted to the required amount, the carrots may then be placed into 115° F. melting point, molten hard fat which is later allowed to congeal around the carrot pieces. The temperature of the fat when the carrots are placed in it, is 210° F. The fat acts as a protective against moisture evaporation, excessive hardening of the fibers etc.

Also, after the carrots have been properly dried, they may be expanded as described herein, by placing them into a sealed chamber at an elevated temperature and at an elevated pressure of about 40 or 50 pounds per square inch. At the end of around 15 or 20 seconds the pressure is instantly released by opening the chamber. This results in further enhanced cooking qualities for the carrots. The carrot pieces may then be coated or dipped into the molten hard fat.

Aside from the other procedures herein mentioned in conjunction with the cooking operation, the food product may be roasted, either in a relatively dry roast, or in oil, or fat, at various points in the procedure, so as to produce various new characteristics.

For example, the product, after it has been given the cooking treatment, or after some drying, may be given a very short dry roast, or it may be given a treatment or boiling in oil or fat. This treatment may take place before or after the explosion. In these various roasting procedures that may take place, however, there is a tendency for the product to become dry or crisp, and this will reduce the quick cooking quality of the food, although it will add various flavor characteristics. Therefore, this roasting procedure is preferably carried out with oil or fat, and not as a dry roast. Also preferably it should be controlled so that some moisture will be left within the product so as to enhance this quick cooking quality. Also care should be taken in the roasting procedure, to crispen or harden the outside or interior portions of the product as little as possible, so as thereby to affect the quick cookable nature of the product as little as possible. To be quickly cookable, the product should remain relatively soft or quickly water-absorbent.

The foods or food pieces which are produced in accord with this invention, whether they have been subjected to only cooking followed by dehydration, or whether they have been further coupled with expansion or explosion, as described herein, may be coated, impregnated, or otherwise treated to render them less susceptible to oxidation or deterioration, or to enable them to retain therein, moisture, flavor, and softness of the fibers, and so as to enhance the quality of being more readily cookable to form a final cooked preparation.

For example, the resulting foodstuff, after treating in accord with the procedures above outlined, may be coated with various preservatives, or protectives against deterioration, either dry, or mixed with liquid materials, or they may be coated with fats or oils, at reduced or increased temperatures, or they may be dusted or coated or impregnated with flavoring materials such as sugar, salt condiments, essential oils, extracts, various types of flavors, etc. either in dry or liquid or dissolved form.

The food products treated in accord with this invention may be divided into two distinct classes, namely, high starch materials such as high starch beans, peas, potatoes, bananas, etc., and also cereals, such as rise, oatmeal, etc.—and low starch or no starch materials, such as meats, fish, celery, etc.

With low starch materials it would not be expected that the cooking treatment, or the further contact of the food with the water present would produce relatively any caking or lumping in the dried end product, and this proves to be correct.

However, with high starch food materials, it would be expected that after the contact of the starch materials with the water of the cooking process, particularly with the final drying operation, that the starch in these materials would finally harden, gum or cake, so as to make quick cookability quite difficult.

However, quite unusually, it is found that this is not the result that occurs with high starch products where they are processed under this invention. Apparently, by the exploding of the starch grains in the cooking operation, there is thereby eliminated or substantially retarded this expected caking or hardening result in the dried end product.

As an example of this, it is known that the usual dehydrated potatoes and dried high starch peas, for instance, are quite difficult to cook, and very much more so than other dehydrated foodstuffs such as low starch carrots. However, after being processed in accord with this invention, high starch peas and low starch carrots can be made to be relatively close in cooking quality to each other.

In the processing of high starch materials in accord with this invention, it is usually desirable to treat them differently from the low starch materials in that these high starch materials generally require dehydration at a lower temperature for better results.

In the preparation of relatively high starch materials such as starchy peas, beans, potatoes, bananas, etc., the use of the cooking treatment, with the subsequent drying and explosion, is usually much more effective in producing quick cookability, the desired food firmness, and other desired qualities of the food products than the use of explosion alone, without the cooking or accessory treatments, etc., as described herein.

Whether in exploded, or unexploded, or in powdered or pulverized form, it is usually desirable to coat, impregnate, or otherwise protect a food produced under this invention with protective materials and particularly with water repellent materials such as oils and fats, and preferably with fats which are in a plastic or hardened condition at room temperature. However, under various conditions various other materials or combinations thereof may be used for impregnation, coating, etc., as for instance, sugar, preferably when it is of a quickly dissolvable or quick cookable nature.

In many cases it has been found desirable to make either an oil-in-water emulsion or a water-in-oil emulsion, but preferably a water-in-fat emulsion, to be used as the protective coating for various food pieces, particularly where briquetting is to be one of the results. An example of a water-in-fat emulsion consists of an emulsion or emulsion-like product of a sugar syrup mixed with a molten hard fat which is then mixed until the hard fat congeals sufficiently to hold the sugar syrup in emulsified form. This material may be used for coating as well as for binding purposes.

Examples of fats or oils that may be used are the vegetable stearins such as cocoanut oil stearin, cotton oil stearin, palm kernel stearin, etc., hydrogenated cottonseed oils, animal fats, olive oil, corn oil, peanut oil, sesame oil, or other fats or oils, or combinations of these or other fats and oils, etc. Mineral waxes, paraffin, etc., may be used in certain cases for specific admixtures or applications, although in edible products, the use of these materials are desired only in small amounts.

Fats of a hardened or plastic nature, such as those described above, may also be used where required as binding agents, where it is desired to form the food materials of this invention either by themselves or in conjunction with other food materials, into cakes, briquettes, or other food units.

Preferably, however, when the food materials of the invention, either with or without other food materials, are formed into such food units, for the purpose of resulting in a quick cooking food brick it is preferable to use as the binding agent, binders which will not readily cake or harden, but rather binders which will very quickly disintegrate and melt or dissolve, etc., so as to provide for quick disintegration of the food bricks or units and thereby so as to promote quick cookability. The preferred binders for this purpose are plastic, or preferably hard fats, and sugars, either alone, or in combination with each other.

Where sugars are used, they should be of a non-crystallizable nature, or when crystallized, they should be in the form of small crystals with passages and pores throughout, so as to enable quick dissolution, or the sugar may be combined with other materials such as glycerine, etc., in order to produce water retaining, or non-crystallizable quality.

For the purpose of briquetting the various food materials of this invention, the various binder materials that are used may be used separately or may be combined in order to produce the best results. For example, an emulsion of the molten hard fat and the sugar syrup may be made where required. Also, if desired, and particularly where hygroscopic materials are present, the molten hard fat may be used as the protective coating for the hygroscopic materials and is congealed thereon, and then the sugar syrup or other sugar materials may be used as the binding agent, so that the aqueous nature of the sugar syrup does not affect the water absorbent qualities of the hygroscopic material. Still further, where desired, the molded food unit, which is bound by a sugar syrup, and in which the pieces have been coated with a fat- or wax-like water repellent material, may be placed into a temperature above the melting point of the water repellent material so as to form laminations, etc., and thereby so as to form a more durable food unit, when congealed.

The advantage of having food pieces which have pores, or passageways, is that, particularly as far as briquetting is concerned these pores or passageways act as a good medium for anchoring the binding agent within each piece, and thereby form a much more substantial food brick.

When molten hard fat is used for instance either as a binding agent or as a protective, it is sometimes desirable to add this molten hard fat at higher temperatures as for instance 200° to 220° F., or higher so as to get a more complete fat coverage, and also in some cases it is desirable immediately after adding the molten hard fat to give the product a quick chill so as to congeal the hard fat as quickly as possible and thereby get as thorough a coating as possible of the hard fat upon the surfaces, and within the interstices and pores of the food pieces. Also in some cases it is desirable to keep the food material for a length of time in the molten fat at the higher temperatures.

In some cases also it may be desirable to use fat of various melting points at different stages in the operations of impregnation of briquetting or coating, as for instance a molten hard fat with a melting point of 100° F. may be used for the purpose of impregnating the food pieces and forming them into a briquette, and a molten hard fat of a melting point of for example 120° F. may be used to coat the finished briquette. The result of this will be to give more resistance against atmospheric temperatures on the outside of the briquette, but to result in a quicker disintegration of the food brick when placed into hot water for cooking.

As noted herein, where it is desired to include hygroscopic materials, such as powdered milk, etc., in a food brick, particularly in conjunction with food pieces which are then treated with aqueous binders or materials such as glucose syrup, etc., it is desirable to coat the milk powder or other hygroscopic materials with a molten hard fat, wax, or other similar water repellent material so as to avoid contamination of the hygroscopic materials with the aqueous nature of the binder or other materials that are used.

In the making of food briquettes, it is often desired to enhance the cooking qualities of the food brick by aerating the food by whipping air or inert gases into the fatty material or into the other materials that are used for binding agents, or by otherwise introducing air into the brick.

Also mixtures of dry effervescent materials such as sodium bicarbonate and tartaric acid may be mixed into the food bricks so that when the brick is cooked the effervescent agents will combine and will form a gas in the brick which will result in the brick rising to the surface of the water so as to enable quicker and more effective cooking procedure.

Also, it is of advantage to include effervescent materials within the brick so as to provide for more ready disintegration of the brick upon cooking by the consumer, in view of the fact that the effervescent materials, upon coming into contact with water, will have a marked tendency to push the various food particles apart so as to permit quick disintegration, and thereby so as to retard the development of any lumpiness or caking.

Along with the cooking and steaming procedures that are used as disclosed herein so as to enhance the structure, fiber or cell disruption of the food materials, other methods of enhancement may be used in conjunction with this cooking operation as for instance, boiling or soaking the food in oil or fat, preliminary to, or as an accessory to, the cooking operation, so as to further soften the fibers.

Instead of the aqueous cooking of these foods, as described herein, this cooking may, in various cases, be substituted by an oil or fat boiling process so as to soften the food fibers and structure. In this procedure, this substitution may be wholly instead of the regular cooking procedure, but generally it should be in combination therewith. In carrying out this procedure in conjunction with the fat, care should be taken not to fry or crispen the food but the process rather, should be one of softening the fibers and cell structure, and of heating the cell structure so as to enable the rupturing of these cells, particularly by the water contained therein.

Or, the food pieces may be subjected to high voltages and currents so as to cause additional cell disruption. These electrical discharges may take place at various points during the procedure, as for instance after the product has been given a steaming or cooking, or while the product is being cooked, and at various other points throughout the procedure. The use of electrical disruption as disclosed herein also may take place while the product is being cooked at room temperature, or under vacuum but preferably while it is under pressure.

In the embodiment of this invention, the processes that are used should preferably be regulated, where possible, so that the end product, upon being cooked by the consumer in the usual cooking or boiling routine, will retain substantially its unity and will not disintegrate into a mushy or mealy mass.

The explosion operation, as described herein, is utilized mainly in conjunction with the foods after the excessive amount of moisture has been reduced from them and preferably when they are of a moisture content below 35%. This lower moisture content is necessary in order to provide for the proper explosive opening of the food material.

However, this explosion may take place while the food retains its full, or a high moisture content, and before, after, or in conjunction with the steaming or cooking operations, for instance, or this explosion may be given to the food while it is in its raw state prior to any cooking or steaming, etc. This explosion operation at the higher moisture content is, not so much for the purpose of opening the structure of the food material, but particularly for the purpose of loosening the food fibers and giving the structure somewhat of a disintegration, so as to enhance the cooking operation of this invention.

This procedure relating to explosion while the food contains larger quantities of water, is particularly adaptable to materials of very fibrous content such as, for instance, meats, and it is also more particularly applicable to larger food pieces such as larger pieces of meat rather than small meat pieces. The reason for this is that unless the food is of a larger piece, or unless it is of a more fibrous nature, the explosion will have a tendency to produce a more or less disunified, soupy, or shredded mass which in most cases would produce a less desirable end product. Of course, temperature, pressure, time, etc. are explosion factors that should be adjusted in this operation to aid in providing the results desired.

The explosion procedure, however, for the general embodiment of this invention, is used primarily in conjunction with the dehydrated food as described herein, for the purpose of disrupting and opening up its interior structure and/or cell structure as much as possible so as to result in a more water-permeable and water-penetratable product with enhanced quick-cooking characteristics.

Still further, at various points throughout the various procedures, enzymes, ferments, or digestives may be utilized for the purpose of aiding in softening or preparing the food so as to enable quicker cookability. This application is particularly important in conjunction with meats and animal protein materials, where such further softening or digestive action produces further enhancement of the qualities desired.

It is generally of advantage to explode or expand the meat or food product before treating it with enzymes or digestives. This treatment with the enzymes may then consist of placing the food into an aqueous medium containing the enzyme. After the expansion process, the digestive medium is better enabled to get within the structure of the food piece and thereby to more readily and more completely affect the food. The enzyme action may be stopped at whatever point is required, as for example, by heat, or other known methods. Also this digestive modification may take place before or after the cooking process, or at various other points in the procedures of this invention, and the product may then be dehydrated, or further treated, as required.

Where it is desired to sterilize, or where it is desired to retard or prevent the growth of mold, etc., the food products of this invention after they have been completed, may be subjected to a sterilization procedure in molten fat whereby they may be retained in the molten fat or in a similar product at a sterilizing temperature for the required period of time. Preferably this should take place in a closed chamber under pressure so that there will be a minimum amount of moisture lost from the food product, particularly if the finished product contains moisture that it is desired to have the product retain in its finished condition, after sterilization.

A further utilization of this invention is in conjunction with extraction and expression procedures. For example various products such as carrots, beets, meat, etc., may be more readily and more completely expressed so as to produce carotene, beet juice, beef juice, etc., by the utilization of this invention. By the process of cooking various food products, and then drying them, in accord with the disclosures herein, there is provided a much easier extraction or expression and a more complete extraction. Of course, where it is desired to express or extract the juices or other element of the dry products, the water or oil medium must be added to the product in order to re-dissolve the flavors and essences, etc., that are contained therein, so as thereby to enable the expression of the elements therefrom in liquid form. In this way the flavors, essences and other elements may be more easily and more completely extracted from these materials for cooking purposes or for purposes other than for the cooking procedure.

What I claim is:

1. The method of preparing a dehydrated food selected from the group consisting of peas and beans, said method comprising cooking the food to soften the cell walls, then drying the food to cause its body structure to become firm, and then disrupting said structure by subjecting the food to steam at an elevated temperature and pressure followed by instantaneously releasing to a lower temperature and pressure.

2. The method of preparing a dehydrated pea, said method comprising cooking the pea to soften the cell walls, then drying the pea to cause its body structure to become firm, and then disrupting said structure by subjecting the pea to steam at an elevated temperature and pressure followed by instantaneously releasing to a lower temperature and pressure.

3. The method of preparing a dehydrated bean, said method comprising cooking the bean to soften the cell walls, then drying the bean to cause its body structure to become firm, and then disrupting said structure by subjecting the bean to steam at an elevated temperature and pressure followed by instantaneously releasing to a lower temperature and pressure.

ALBERT MUSHER.